United States Patent
Sato et al.

(10) Patent No.: US 9,051,908 B2
(45) Date of Patent: Jun. 9, 2015

(54) AIR INTAKE APPARATUS FOR INTERNAL COMBUSTION ENGINE

(71) Applicant: DENSO CORPORATION, Kariya, Aichi-pref. (JP)

(72) Inventors: Shingo Sato, Nagoya (JP); Syuhei Kuwano, Chiryu (JP); Masao Ino, Toyota (JP)

(73) Assignee: DENSO CORPORATION, Kayiya (JP)

( * ) Notice: Subject to any disclaimer, the term of this patent is extended or adjusted under 35 U.S.C. 154(b) by 43 days.

(21) Appl. No.: 13/857,412

(22) Filed: Apr. 5, 2013

(65) Prior Publication Data
US 2013/0263811 A1    Oct. 10, 2013

(30) Foreign Application Priority Data

Apr. 5, 2012 (JP) .................................. 2012-86490
Sep. 12, 2012 (JP) ................................ 2012-200273

(51) Int. Cl.
*F02M 35/10* (2006.01)
*F02M 35/12* (2006.01)
*F02B 27/02* (2006.01)
*F02M 35/14* (2006.01)

(52) U.S. Cl.
CPC ..... *F02M 35/1255* (2013.01); *F02M 35/10144* (2013.01); *F02M 35/12* (2013.01); *F02B 27/0263* (2013.01); *F02M 35/14* (2013.01); *F02B 27/0252* (2013.01); *F02B 27/0273* (2013.01); *Y02T 10/146* (2013.01)

(58) Field of Classification Search
CPC ... F02M 35/12; F02M 15/14; F02M 15/1044; F02M 35/10039; F02B 27/02; F02B 27/00; F02B 27/0263; F02B 27/0257; F02B 27/0284
USPC .............. 123/184.57, 184.55, 184.53, 184.45
See application file for complete search history.

(56) References Cited

U.S. PATENT DOCUMENTS

| | | | | |
|---|---|---|---|---|
| 5,211,139 A | * | 5/1993 | Houle et al. | 123/184.47 |
| 5,632,239 A | * | 5/1997 | Patyi et al. | 123/184.36 |
| 6,955,149 B1 | * | 10/2005 | Christie et al. | 123/184.55 |
| 7,225,779 B2 | * | 6/2007 | Akima et al. | 123/184.55 |

FOREIGN PATENT DOCUMENTS

JP         2006-97650         4/2006

* cited by examiner

*Primary Examiner* — Stephen K Cronin
*Assistant Examiner* — Syed O Hasan
(74) *Attorney, Agent, or Firm* — Nixon & Vanderhye P.C.

(57) ABSTRACT

A resonator has a volume chamber, which is communicated with a surge tank through a communication passage. A primary intake passage communicates between a cylinder of an internal combustion engine and the surge tank. A secondary intake passage communicates between the surge tank and one of the cylinder and the primary intake passage. A passage length of the secondary intake passage is shorter than a passage length of the primary intake passage. A variable intake valve is fixed to a shaft. The variable intake valve opens and closes the secondary intake passage. A resonator valve is fixed to the shaft. The resonator valve opens and closes the communication passage. A drive device rotates the shaft to drive the variable intake valve and the resonator valve.

12 Claims, 11 Drawing Sheets

AIR INTAKE APPARATUS FOR INTERNAL COMBUSTION ENGINE

CROSS REFERENCE TO RELATED APPLICATION

This application is based on and incorporates herein by reference Japanese Patent Application No. 2012-86490 filed on Apr. 5, 2012 and Japanese Patent Application No. 2012-200273 filed on Sep. 12, 2012.

TECHNICAL FIELD

The present disclosure relates to an air intake apparatus for an internal combustion engine.

BACKGROUND

Previously, an air intake apparatus, which distributes air to cylinders of an internal combustion engine, is known.

For example, JP2006-97650A teaches an air intake apparatus, in which a surge tank and each cylinder are communicated with each other through a primary intake passage and a secondary intake passage, which have different passage lengths, respectively. The passage length of the secondary intake passage between the surge tank and the corresponding cylinder is shorter than that of the primary intake passage. The air intake apparatus increases a volumetric efficiency of the intake air by inertial supercharging of the intake air by opening and closing a variable intake valve, which is provided in the secondary intake passage, based on the engine speed of the internal combustion engine.

Furthermore, this air intake apparatus includes a resonator valve, which is placed between the surge tank and a resonator and includes an outer tube and an inner tube. In this resonator valve, when the inner tube, which is communicated with the surge tank, is rotated, a size of an opening of a slit, which is formed in the outer tube, is adjusted. In this way, the air intake apparatus adjusts a resonance frequency of the resonator, which is communicated with the slit of the outer tube, to increase a volumetric efficiency of the intake air by the resonance effect.

The air intake apparatus of JP2006-97650A is constructed such that a shaft, which forms a rotatable shaft of the variable intake valve, and a shaft, which forms a rotatable shaft of the inner tube of the resonator, are driven synchronously through gears and a lost-motion mechanism. The two shafts are driven by a single actuator to open and close the variable intake valve and the resonator valve. Therefore, the structure of the air intake apparatus is complicated, and the number of the components is increased. As a result, the manufacturing costs may possibly be increased, and the reliability may possibly be deteriorated.

Furthermore, slide friction between the outer tube and the inner tube of the resonator valve and slide friction of the gears and the lost-motion mechanism may possibly cause an increase in a required torque, which is required to rotate the two shafts. Therefore, a high power actuator may be required.

SUMMARY

The present disclosure is made in view of the above disadvantages.

According to the present disclosure, there is provided an air intake apparatus for an internal combustion engine, including a surge tank, a resonator, a primary intake passage, a secondary intake passage, a shaft, a variable intake valve, a resonator valve and a drive device. Air is guided to the surge tank. The resonator has a volume chamber, which is communicated with the surge tank through a communication passage. The primary intake passage communicates between a cylinder of the internal combustion engine and the surge tank. The secondary intake passage extends in an imaginary plane that is generally parallel to an extending direction of the communication passage. The secondary intake passage communicates between the surge tank and one of the cylinder and the primary intake passage, and a passage length of the secondary intake passage is shorter than a passage length of the primary intake passage. The shaft extends through the communication passage and the secondary intake passage, which are arranged one after another in a direction perpendicular to the imaginary plane. The variable intake valve is fixed to the shaft. The variable intake valve opens and closes the secondary intake passage. The resonator valve is fixed to the shaft. The resonator valve opens and closes the communication passage. The drive device rotates the shaft to drive the variable intake valve and the resonator valve.

BRIEF DESCRIPTION OF THE DRAWINGS

The drawings described herein are for illustration purposes only and are not intended to limit the scope of the present disclosure in any way.

DETAILED DESCRIPTION

Embodiments of the present disclosure will be described with reference to the accompanying drawings.

First Embodiment

FIGS. 1 to 7 show an air intake apparatus of a first embodiment of the present disclosure. The air intake apparatus of the present embodiment is an intake manifold, which distributes the intake air to respective cylinders of, for example, a four cylinder internal combustion engine.

Figure 1:
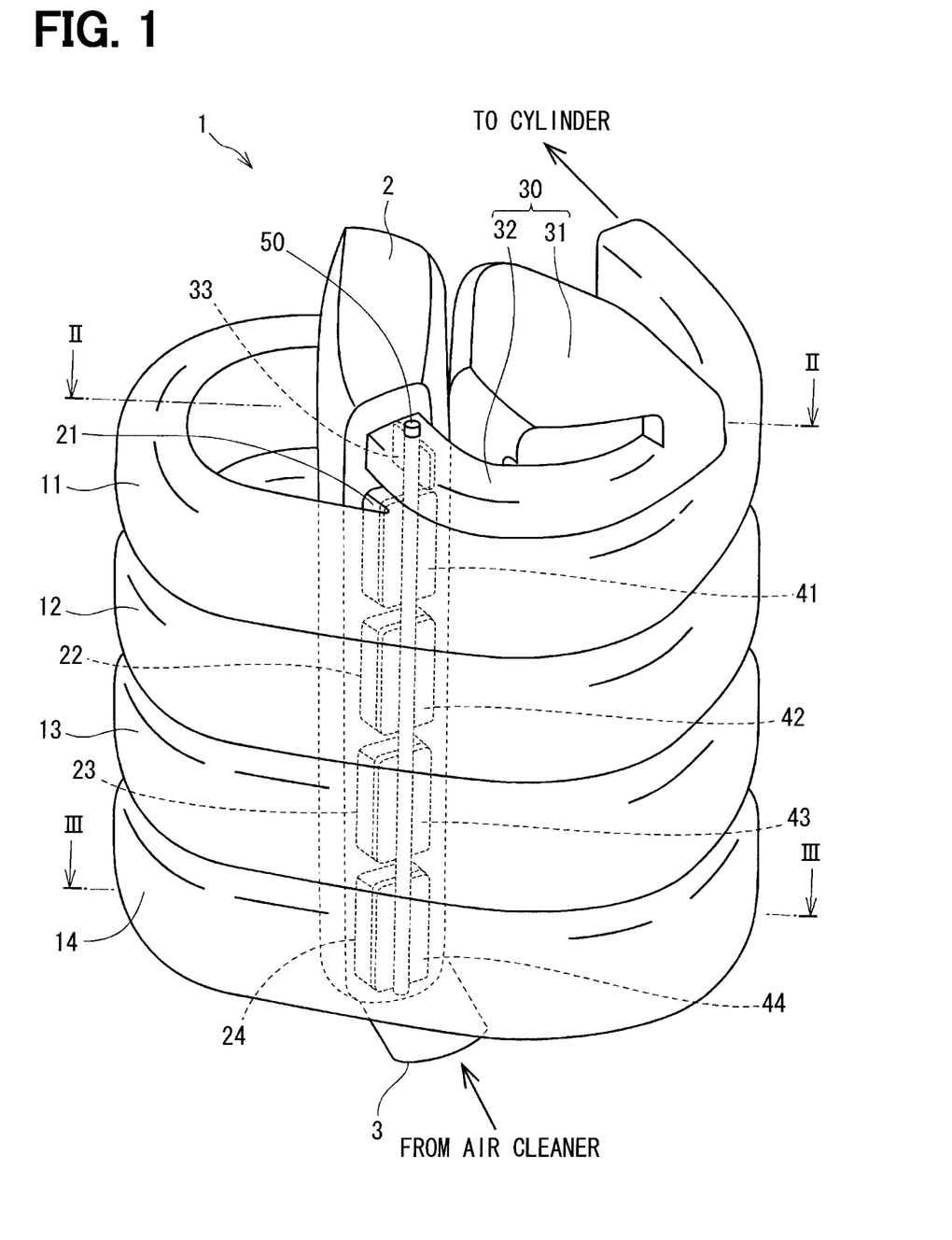
FIG. 1 is a perspective view of an air intake apparatus according to a first embodiment of the present disclosure.

With reference to FIG. 1, the air intake apparatus 1 is made of a resin material or a metal material (e.g., aluminum) and includes a surge tank 2, primary intake passages 11-14, secondary intake passages 21-24 and a resonator 30.

Figure 4:
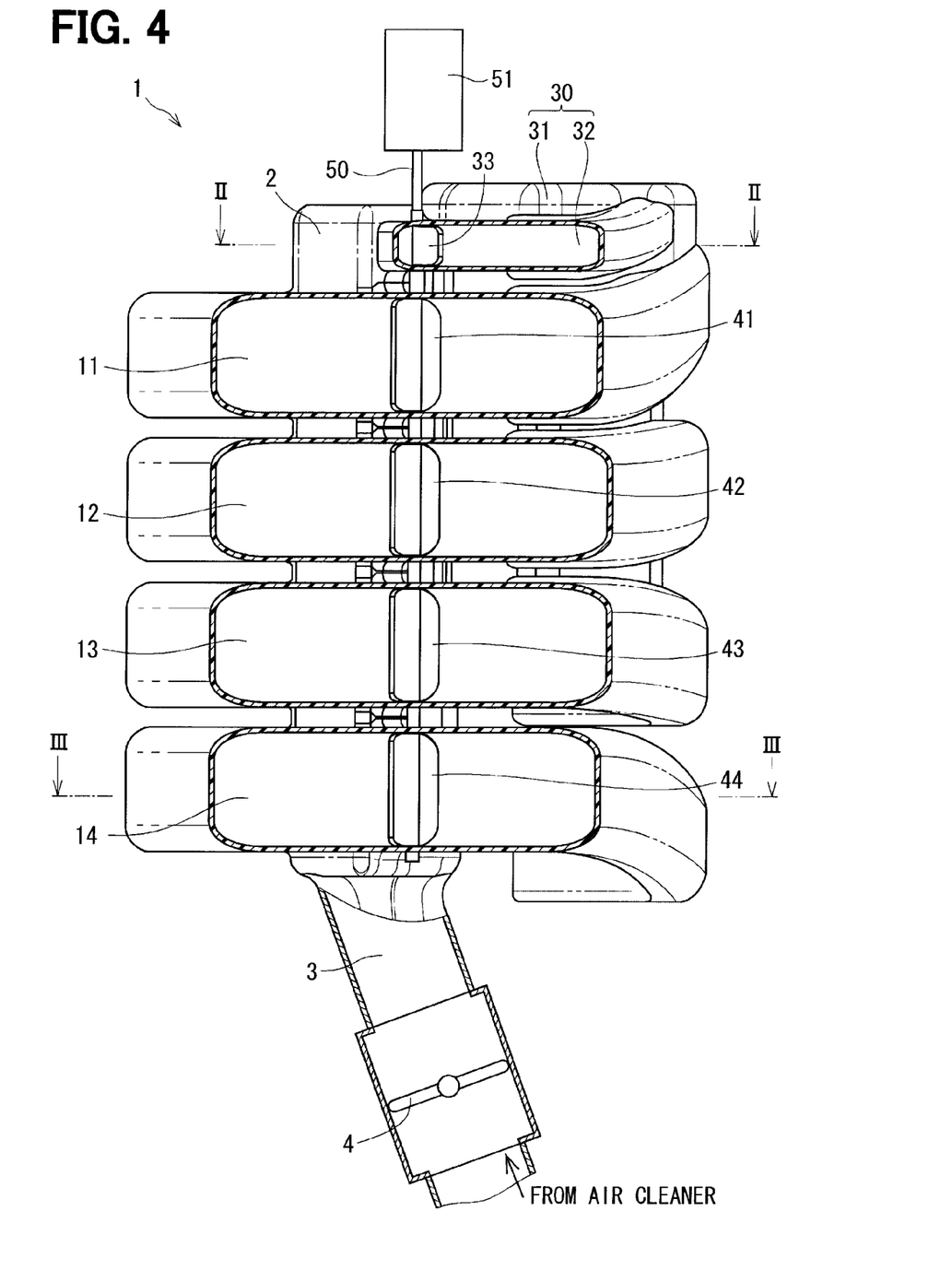
FIG. 4 is a cross-sectional view taken along line IV-IV in FIGS. 2 and 3.

The air is guided into the surge tank 2 from an air intake port (not shown) through an air cleaner. As shown in FIG. 4, a throttle valve 4 is provided between an intake port 3 of the surge tank 2 and the air cleaner.

Figure 3:
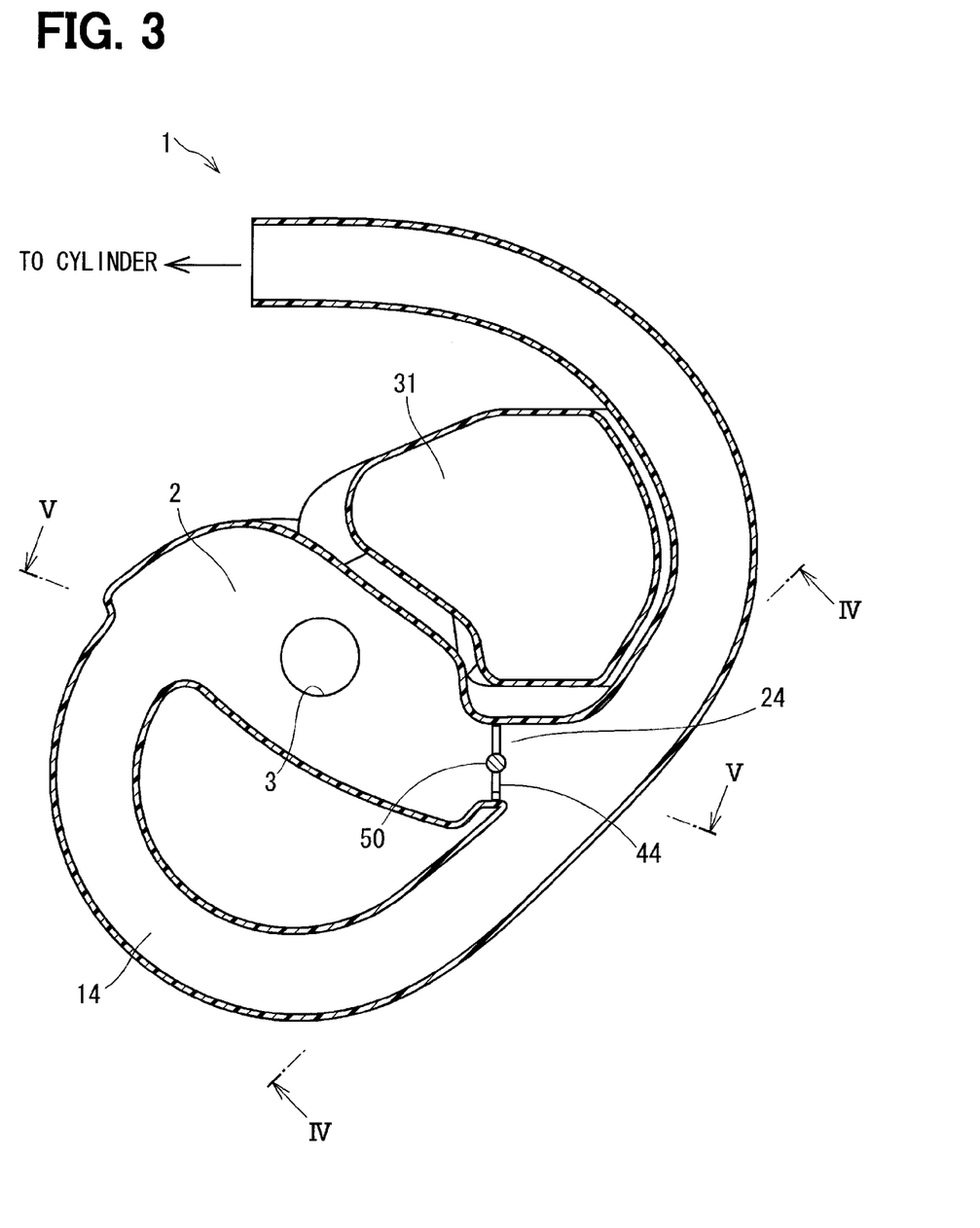
FIG. 3 is a cross-sectional view taken along line III-III in FIGS. 1 and 4.

As shown in FIGS. 1 and 3, the primary intake passages 11-14 surround the surge tank 2 and the resonator 30 on a radially outer side of the surge tank 2 and the resonator 30. One end of each primary intake passage 11-14 is connected to the surge tank 2, and the other end of each primary intake passage 11-14 is installed to a cylinder head (not shown) of the engine through a gasket (not shown). Thereby, each primary intake passage 11-14 communicates between the corresponding cylinder of the engine and the surge tank 2.

Each of the secondary intake passages 21-24 communicates between the surge tank 2 and a corresponding one of the primary intake passages 11-14. A distance from the surge tank 2 to the corresponding cylinder through the corresponding secondary intake passage 21-24 is shorter than a distance from the surge tank 2 to the cylinder through the corresponding primary intake passage 11-14 without passing through the secondary intake passage 21-24. In the air intake apparatus 1, each variable intake valve 41-44, which is installed in the corresponding secondary intake passage 21-24, is opened and closed based on the engine speed (the rotational speed) of the engine to increase a volumetric efficiency of the intake air by an inertial supercharging effect of the corresponding primary intake passage 11-14 or an inertia supercharging effect of the secondary intake passage 21-24.

The volumetric efficiency is a quantity of intake air, which is drawn into the cylinder during an intake stroke of a piston received in the cylinder, relative to a volume of the cylinder.

Figure 2:
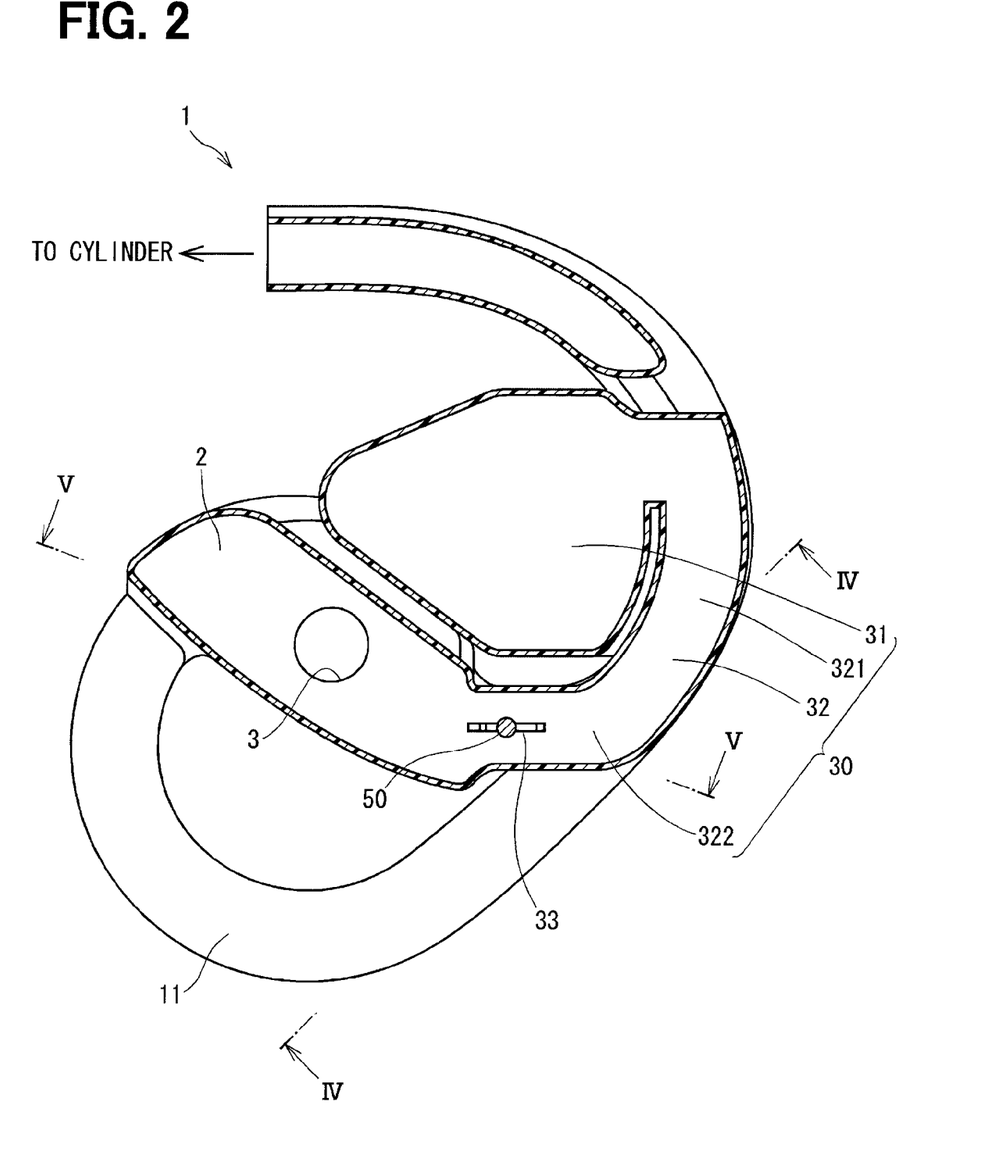
FIG. 2 is a cross-sectional view taken along line II-II in FIGS. 1 and 4.

As shown in FIGS. 1 and 2, the resonator 30 includes a volume chamber 31 and a communication passage 32. The communication passage 32 includes a primary communication passage 321 and a secondary communication passage 322. The primary communication passage 321 extends generally parallel to a corresponding portion of each of the primary intake passages 11-14, which overlaps with the primary communication passage 321 in a direction parallel to an axial direction of a shaft 50. The secondary communication passage 322 extends generally parallel to the secondary intake passages 21-24. The primary communication passage 321 and the secondary communication passage 322 are smoothly communicated with each other.

The volume chamber 31 is communicated with the surge tank 2 through the communication passage 32. A resonance frequency of the resonator 30 is set based on a volume of the volume chamber 31, a length of the communication passage 32 and an inner diameter of the communication passage 32. The air intake apparatus 1 can increase the volumetric efficiency of the intake air by the resonance effect, which is produced by the resonance of the resonator 30 with the intake air pulsation at a predetermined engine speed upon opening of a resonator valve 33, which is installed in the communication passage 32.

Figure 5:
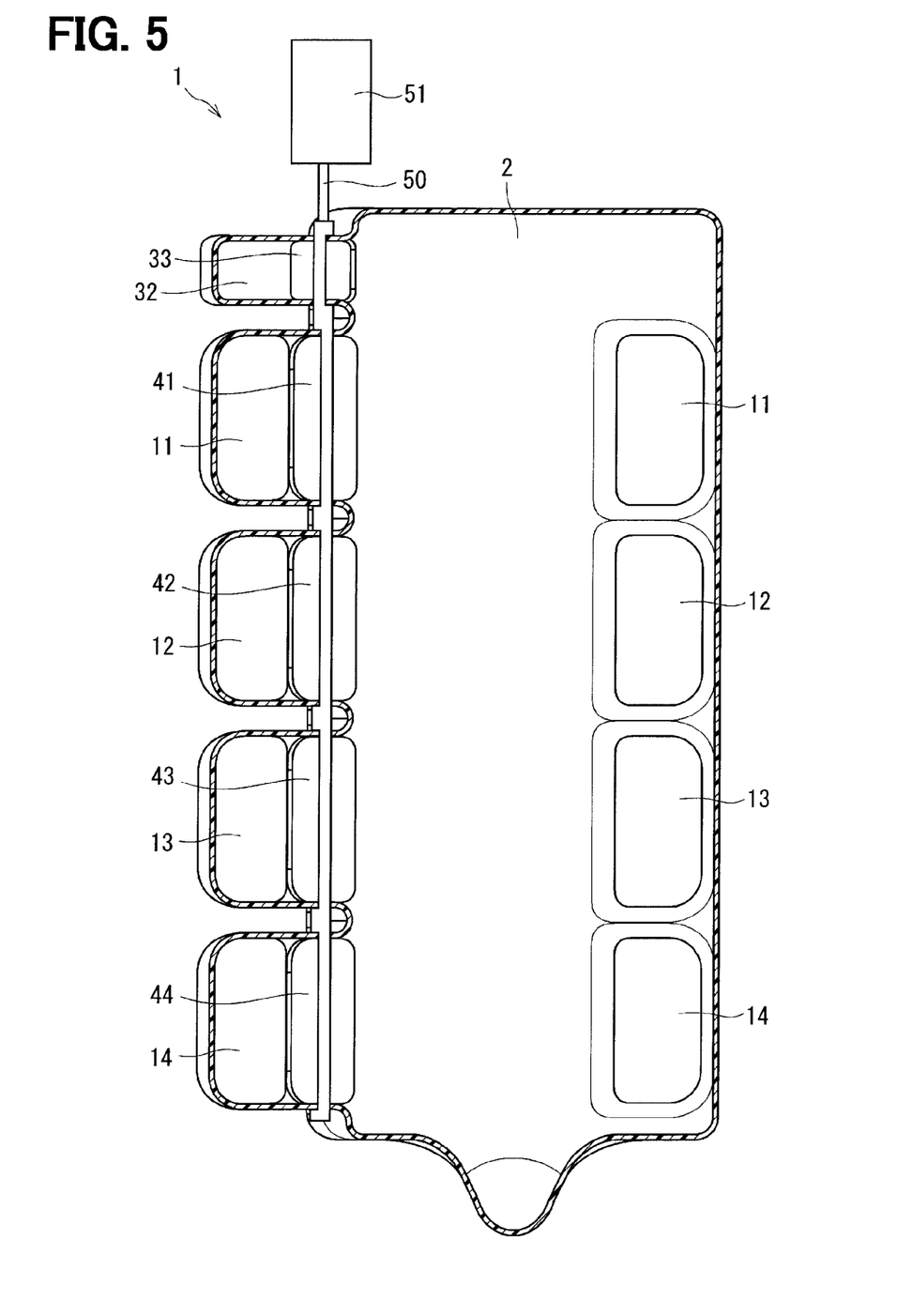
FIG. 5 is a cross sectional view taken along line V-V in FIGS. 2 and 3.

As shown in FIGS. 2 and 3, in the present embodiment, the four secondary intake passages 21-24 extend generally parallel to the communication passage 32. Here, it is only required that each of the secondary intake passages 21-24 extends in a corresponding imaginary plane, which is generally parallel to an extending direction of the communication passage 32, and the secondary intake passages 21-24 are arranged one after another in a direction generally perpendicular to the imaginary plane. As shown in FIGS. 4 and 5, the single shaft 50, which extends in a direction generally perpendicular to each imaginary plane, extends through the four secondary intake passages 21-24 and the secondary communication passage 322. The four secondary intake passages 21-24 and the secondary communication passage 322 are arranged one after another in a row in the axial direction of the shaft 50.

The variable intake valves 41-44, which open and close the secondary intake passages 21-24, respectively, and the resonator valve 33, which opens and closes the communication passage 32, are formed as butterfly valves, respectively, and are arranged one after another in the axial direction of the shaft 50. In the present embodiment, the variable intake valves 41-44 and the resonator valve 33 are fixed to the shaft 50 such that the resonator valve 33 is displaced by about 90 degrees from the variable intake valves 41-44 in a view taken in the axial direction of the shaft 50. The angle of the resonator valve 33 relative to the variable intake valves 41-44 is not limited to 90 degrees and may be changed to any other appropriate angle as long as the resonator valve 33 closes the communication passage 32 in the state where the variable intake valves 41-44 open the secondary intake passages 21-24, respectively. In other words, the variable intake valves 41-44 and the resonator valve 33 may be arranged at any angle as long as the resonator valve 33 opens the communication passage 32 in the state where the variable intake valves 41-44 close the secondary intake passages 21-24, respectively.

An actuator 51 is installed to one end portion of the shaft 50. The actuator 51 serves as a drive device (drive means), which drives the shaft 50 to rotate the shaft 50. The actuator 51 is driven by a command outputted from an undepicted electronic control unit (ECU), which serves as an electronic control device, so that the actuator 51 drives the variable intake valves 41-44 and the resonator valve 33 to simultaneously rotate the variable intake valves 41-44 and the resonator valve 33. The actuator 51 can drive the variable intake valves 41-44 and the resonator valve 33 such that an opening state (opening degree) of each of the variable intake valves 41-44 and the resonator valve 33 can be controlled among three states, i.e., a fully opened state (a full opening degree), a fully closed state (a full closing degree) and a partially opened state (a partially opening degree). Here, it should be noted that the partially opened state (also referred to as a half-opened state or a semi-opened state) is not limited to the state of the corresponding passage, which is opened by a half amount. That is, as long as a portion of the passage is opened, it will be referred to as the partially opened state.

The ECU receives information, such as the engine speed (the rotational speed of the engine). The ECU outputs the signal to drive the actuator 51 based on the above information.

Next, a relationship between the engine speed (RPM) and the volumetric efficiency (ηv) of the intake air will be described with reference to FIG. 8.

Figure 8:
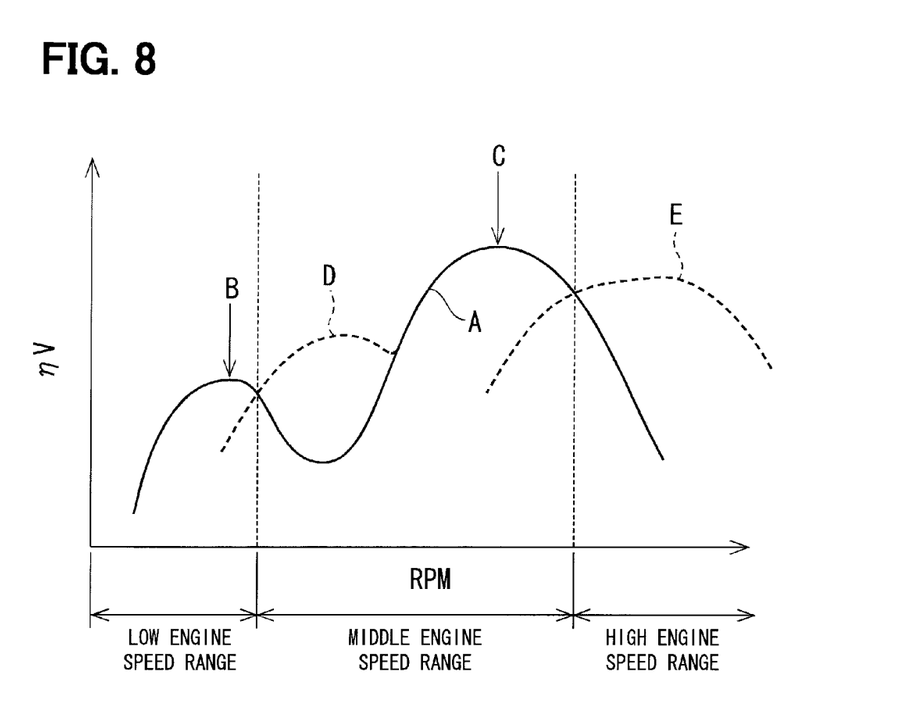
FIG. 8 is a diagram showing a characteristic curve of a volumetric efficiency of intake air in a case of an air intake apparatus, which does not have a resonator and a secondary intake passage, along with lines (dotted lines), which indicate characteristic features of the first embodiment.

A solid line A of FIG. 8 indicates the analysis data, which shows the volumetric efficiency of the intake air in the case where the air intake apparatus does not have the resonator and the secondary intake passages. In such a case, the volumetric efficiency shows a curve, which has two peaks, i.e., a peak at a portion B, which is in a low engine speed range, and a peak at a portion C, which is in a middle engine speed range. The engine speed in the low engine speed range, the middle engine speed range and/or the high engine speed range may vary depending on the characteristics of the engine, such as the volume of each cylinder and/or the number of the cylinders.

The volumetric efficiency at the portion B is increased by a reflected wave, which is reflected from the atmosphere side of the throttle valve. The reflected wave refers to a reflected wave of the intake air pulsation. Furthermore, "the reflected wave, which is reflected from the atmosphere side of the throttle valve," refers to the reflected wave of the intake air pulsation, which is reflected from an atmosphere open end of the intake air passage, which opens to the atmosphere and is communicated with the air intake apparatus 1. A distance difference between the primary intake passage and the secondary intake passage is very small in comparison to a distance from any of the cylinders to the atmosphere open end. Therefore, at the portion B, the opening and closing movement of the variable intake valve does not have a substantial influence on the reflected wave, which is reflected from the atmosphere side of the throttle valve.

Furthermore, the volumetric efficiency of the portion C is increased by the reflected wave from the surge tank. A propagation distance of the intake air pulsation from the cylinder to the surge tank shows a large rate of change caused by the opening and closing movement of the variable intake valve. Therefore, the opening and closing movement of the variable intake valve has the large influence on the reflected wave from the surge tank at the portion C.

A dotted line D in FIG. 8 shows the volumetric efficiency in the case where the resonator is provided in the air intake apparatus, and the resonator valve is opened. The volumetric efficiency of the intake air is increased by the resonance effect, which is produced by the resonance of the resonator 30 with the intake air pulsation at the predetermined engine speed in the resonance frequency range, which is set based on the volume of the volume chamber, the length of the communication passage and the inner diameter of the communication passage.

A dotted line E of FIG. 8 indicates the volumetric efficiency in the case where the secondary intake passages are provided in the air intake apparatus, and the variable intake valve is opened. The secondary intake passage increases the volumetric efficiency of the intake air by the reflected wave, which is reflected from the surge tank through the secondary intake passage.

Next, the operation of the air intake apparatus 1 of the present embodiment will be described with reference to FIGS. 6 and 7. In FIG. 7, the volumetric efficiency of the intake air, which is achieved by the operation of the air intake apparatus 1, is indicated by a solid line I.

The air intake apparatus 1 of the present embodiment can maintain the high volumetric efficiency in the low engine speed range, the middle engine speed range and the high engine speed range of the engine by simultaneously controlling the variable intake valves 41-44 and the resonator valve 33 through the single shaft 50. This operational control is particularly effective in the high load state of the engine (i.e., the state of the high engine load).

The control operation from the engine stop time to the engine start time will be described.

Figure 6:
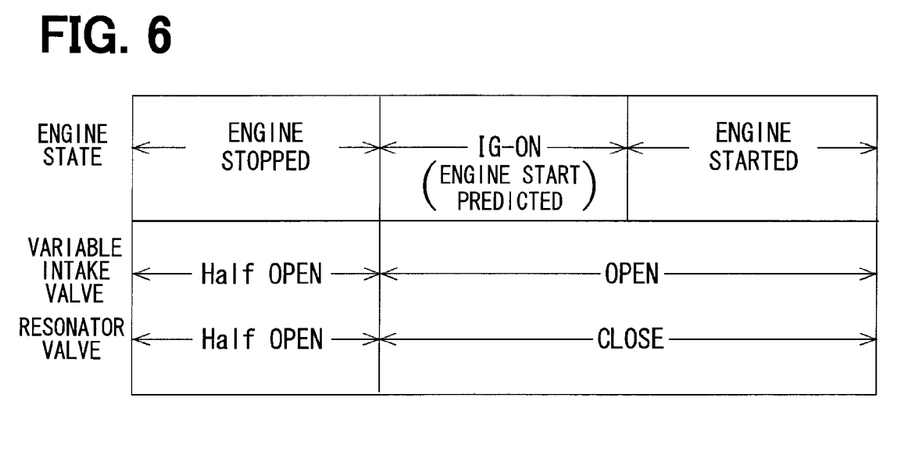
FIG. 6 is a diagram showing a control operation of the air intake apparatus of the first embodiment at the time of engine stop and at the time of engine start.
Figure 7:
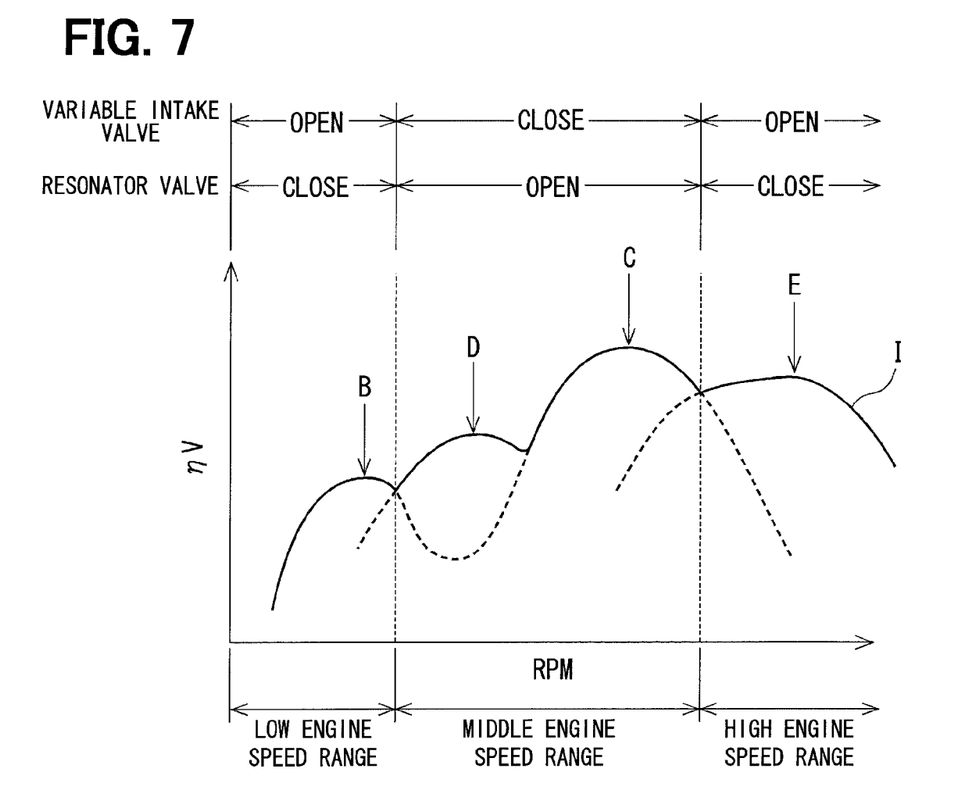
FIG. 7 is a diagram showing characteristic curves of a volumetric efficiency of intake air in a case of the air intake apparatus of the first embodiment.

As shown in FIG. 6, at the time of engine stop (i.e., the state, in which the engine is stopped), the variable intake valves 41-44 and the resonator valve 33 are partially opened (half-opened) in the air intake apparatus 1. In this way, for instance, even in the case where the oil, which is present in the secondary intake passage 21-24, is solidified, it is possible to limit sticking, i.e., fastening of the corresponding variable intake valve 41-44 to the inner wall of the corresponding secondary intake passage 21-24. Furthermore, even in the case where the oil, which is present in the communication passage 32, is solidified, it is possible to limit sticking, i.e., fastening of the resonator valve 33 to the inner wall of the communication passage 32. The reason for placing the resonator valve 33 and the variable intake valves 41-44 into the partially opened state (the half-opened state) is as follows. That is, if one of each variable intake valve 41-44 and the resonator valve 33 is placed in the fully opened state, the other one of each variable intake valve 41-44 and the resonator valve 33 is placed in the fully closed state to possibly cause the sticking, i.e., the fastening of the other one of each variable intake valve 41-44 and the resonator valve 33.

The air intake apparatus 1 opens the variable intake valves 41-44 and closes the resonator valve 33 when the engine start is predicted or when the engine start is sensed. The engine start can be predicted by sensing placement of an ignition switch to an accessory (ACC) position or an ON position. Furthermore, the engine start can be sensed by sensing placement of the ignition switch to a start position.

In a case of a vehicle having an idle reduction system (also referred to as an idling stop system), the engine start can be predicted by sensing depression of a brake pedal by a driver of the vehicle. Furthermore, the engine start can be sensed by sensing release of the depression of the brake pedal by the driver of the vehicle.

When each variable intake valve 41-44 is opened in the state, in which the engine start is predicted, or the state, in which the engine start is sensed, a pressure difference between the pressure on the cylinder side of the variable intake valve 41-44 and the pressure on the surge tank side of the variable intake valve 41-44 caused by a backfire at the time of engine start is reduced. Therefore, the load, which is applied to each of the variable intake valves 41-44, can be reduced. Furthermore, when the resonator valve 33 is closed, it is possible to limit an increase in the pressure of the resonator volume chamber 31 caused by propagation of the backfire at the time of engine start.

Next, a control operation after the time of engine start will be described.

As shown in FIG. 7, the air intake apparatus 1 opens each of the variable intake valves 41-44 and closes the resonator valve 33 in the low engine speed range. In the present embodiment, the low engine speed range is a range, in which the volumetric efficiency achieved with the resonation of the resonator 30 is lower than the volumetric efficiency achieved with the reflected wave from the atmosphere side of the surge tank 2.

The air intake apparatus 1 opens the resonator valve 33 and closes each of the variable intake valves 41-44 in the middle engine speed range. In the present embodiment, the middle engine speed range is a range (a period) that is from a time, at which the volumetric efficiency achieved with the resonance of the resonator 30 becomes higher than the volumetric efficiency achieved with the reflected wave from the atmosphere side of the surge tank 2, to a time, at which the volumetric efficiency achieved with the reflected wave from the surge tank 2 through the primary intake passage 11-14 is higher than the volumetric efficiency achieved with the reflected wave from the surge tank 2 through the secondary intake passage 21-24.

When the resonator valve 33 is opened in the middle engine speed range, the volumetric efficiency can be increased by a resonance supercharging effect in a portion D, which is located between the portion B and the portion C in FIG. 7. Furthermore, when each of the variable intake valve 41-44 is closed, the volumetric efficiency of the portion C can be increased by the inertial supercharging effect of the reflected wave from the surge tank 2 through the corresponding primary intake passage 11-14.

The air intake apparatus 1 opens each of the variable intake valves 41-44 and closes the resonator valve 33 in the high engine speed range. In the present embodiment, the high engine speed range is a range, in which the volumetric efficiency achieved with the reflected wave from the surge tank 2 through the secondary intake passage 21-24 is higher than the volumetric efficiency achieved with the reflected wave from the surge tank 2 through the primary intake passage 11-14. When each of the variable intake valves 41-44 is opened in the high engine speed range, the volumetric efficiency of the intake air can be increased in a portion E of FIG. 7 by the reflected wave from the surge tank 2 through the secondary intake passage 21-24.

Now, the advantages of the present embodiment will be described.

(1) In the present embodiment, each of the secondary intake passages 21-24 extends in the corresponding imaginary plane, which is generally parallel to the communication passage 32 of the resonator 30. Furthermore, the resonator valve 33 and the variable intake valves 41-44 are fixed to the single shaft 50, which extends through the communication passage 32 and the secondary intake passages 21-24. Thereby, the air intake apparatus 1 can simultaneously drive the variable intake valves 41-44 and the resonator valve 33 by rotating the single shaft 50 with the actuator 51. Therefore, the air intake apparatus 1 can control the opening and closing movements of the valves with the simple structure. Thus, the number of the components can be reduced, and thereby the manufacturing costs can be reduced. Furthermore, the reliability of the opening and closing movements of the valves can be improved.

Also, with the use of the single shaft 50, the slide friction of the shaft 50 can be reduced, and the output of the actuator 51 of the air intake apparatus 1 can be reduced.

(2) In the present embodiment, the variable intake valves 41-44 and the resonator valve 33 are arranged one after another in the single row in the axial direction of the shaft 50. Thereby, it is possible to extend the single shaft 50 through the communication passage 32 and the secondary intake passages 21-24 and to fix the variable intake valves 41-44 and the resonator valve 33 to the shaft 50.

(3) In the present embodiment, the variable intake valves 41-44 and the resonator valve 33 are fixed to the single shaft 50 in a manner that satisfies the following two conditions, i.e., the resonator valve 33 closes the communication passage 32 when the valve intake valves 41-44 open the secondary intake passages 21-24, respectively; and the resonator valve 33 opens the communication passage 32 when the variable intake valves 41-44 close the secondary intake passages 21-24, respectively.

With the above construction, the variable intake valves 41-44 and the resonator valve 33 can be simultaneously driven by the single shaft 50 based on the engine speed.

(4) In the present embodiment, the air intake apparatus 1 (more specifically, the actuator 51) closes the variable intake valves 41-44 and opens the resonator valve 33 in the middle engine speed range. In this way, the volumetric efficiency can be increased by the resonance supercharging effect of the resonator 30. Furthermore, in the range, in which the resonance supercharging effect of the resonator 30 is reduced, the volumetric efficiency can be increased by the inertial supercharging effect of the reflected wave from the surge tank 2 through the corresponding primary intake passage 11, 14.

(5) In the present embodiment, the air intake apparatus 1 opens the variable intake valves 41-44 and closes the resonator valve 33 in the high engine speed range. In this way, the volumetric efficiency can be increased by the inertial supercharging effect of the reflected wave from the surge tank 2 through each corresponding secondary intake passage 21-24.

(6) In the present embodiment, the air intake apparatus 1 partially opens (half-opens) the variable intake valves 41-44 in the stop state of the engine. In this way, none of the valves 33, 41-44 is closed. Therefore, the sticking (fastening) of the variable intake valves 41-44 to the inner walls of the secondary intake passages 21-24 can be limited, and the sticking (fastening) of the resonator valve 33 to the inner wall of the communication passage 32 can be limited.

(7) In the present embodiment, the air intake apparatus 1 opens the variable intake valves 41-44 and closes the resonator valve 33 when the engine start is predicted or when the engine start is sensed. In this way, the pressure difference between the pressure on the cylinder side of the variable intake valve 41-44 and the pressure on the surge tank side of the variable intake valve 41-44 caused by the backfire at the time of the engine start can be reduced. Therefore, the load, which is applied to each of the variable intake valves 41-44, can be reduced. Furthermore, when the resonator valve 33 is closed, it is possible to limit an increase in the pressure of the resonator volume chamber 31 caused by propagation of the backfire at the time of engine start. Therefore, a damage of the resonator volume chamber 31 can be limited.

Second Embodiment

Figure 9:
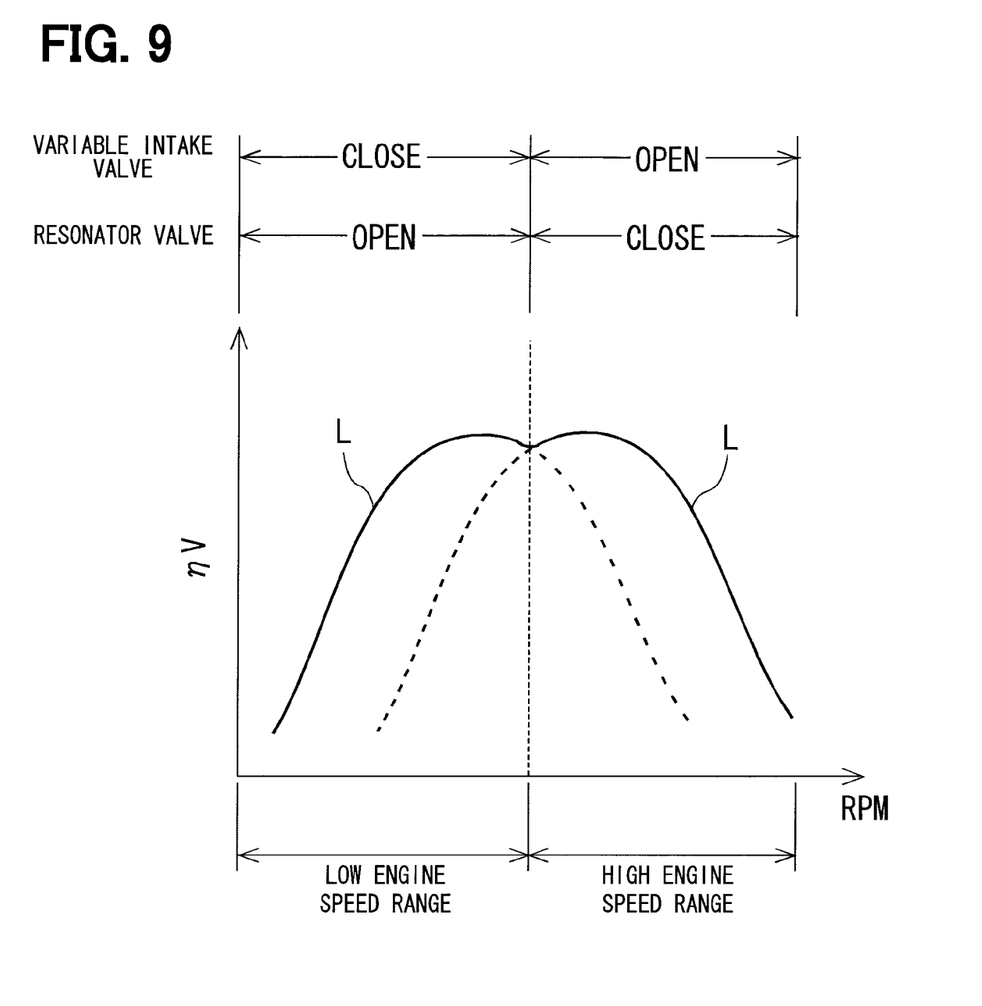
FIG. 9 is a diagram showing characteristic curves of a volumetric efficiency of intake air in a case of an air intake apparatus according to a second embodiment of the present disclosure.

FIG. 9 shows a second embodiment of the present disclosure. The second embodiment will be described with respect to a control operation of an air intake apparatus provided to an internal combustion engine, which has output characteristics that are different from those of the first embodiment.

Figure 10:
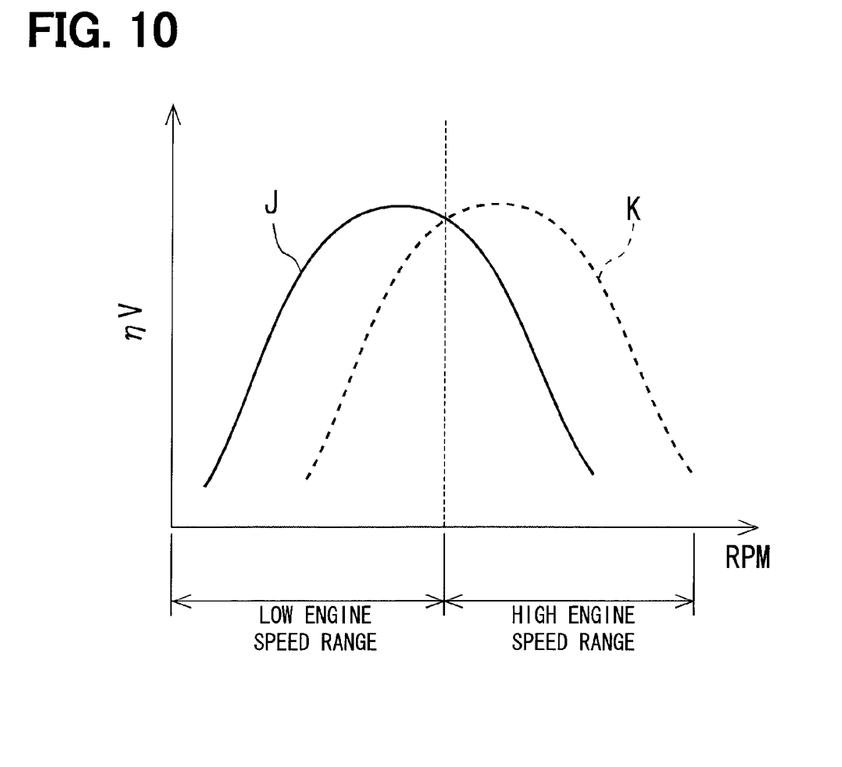
FIG. 10 is a diagram showing a characteristic curve of a volumetric efficiency of intake air in a case of an air intake apparatus, which does not have a resonator and a secondary intake passage in another internal combustion engine, along with a line (dotted line), which indicates a characteristic feature of the second embodiment.

A solid line J of FIG. 10 indicates a volumetric efficiency of the intake air in a case where the air intake apparatus closes the variable intake valves 41-44 of the secondary intake passages 21-24. In this case, the volumetric efficiency forms a curve that has a single peak, which extend from the low engine speed range to the high engine speed range. The engine speed in the low engine speed range and the high engine speed range may possibly vary depending on the volume of each cylinder and the number of the cylinders.

A dotted line K of FIG. 10 indicates a volumetric efficiency of the intake air in a case where the air intake apparatus opens the variable intake valves 41-44 of the secondary intake passages 21-24. Each secondary intake passage 21-24 increases the volumetric efficiency of the intake air by the reflected wave, which is reflected from the surge tank through the secondary intake passage 21-24.

Next, the operation of the air intake apparatus of the second embodiment will be described with reference to FIG. 9. In FIG. 9, a solid line indicates the volumetric efficiency of the intake air upon the operation of the air intake apparatus of the present embodiment.

Even in the second embodiment, at the time of engine stop, the variable intake valves 41-44 and the resonator valve 33 are partially opened in the air intake apparatus 1. The air intake apparatus 1 opens the variable intake valves 41-44 and closes the resonator valve 33 when the engine start is predicted or when the engine start is sensed. That is, the control operation of the air intake apparatus 1 at the time of engine stop to the time of engine start is similar to the control operation of the air intake apparatus 1 of the first embodiment.

Next, the control operation of the air intake apparatus 1 after the engine start will be described. The control operation described below is particularly effective at the high engine load.

As shown in FIG. 9, the air intake apparatus 1 closes the variable intake valves 41-44 and opens the resonator valve 33 in the low engine speed range. The low engine speed range of the second embodiment is a range, in which the volumetric efficiency in the closed state of the variable intake valves 41-44 is higher than the volumetric efficiency in the open state of the variable intake valves 41-44.

In contrast, the air intake apparatus 1 opens each of the variable intake valves 41-44 and closes the resonator valve 33 in the high engine speed range. The high engine speed range of the second embodiment is a range, in which the volumetric efficiency in the open state of the variable intake valve 41-44 is higher than the volumetric efficiency in the closed state of the variable intake valve 41-44.

When the variable intake valves 41-44 are opened in the high engine speed range, the volumetric efficiency of the intake air can be increased by the reflected wave from the surge tank 2 through the secondary intake passages 21-24.

Even in the second embodiment, advantages, which are similar to those of the first embodiment, can be achieved.

Third Embodiment

Figure 11:
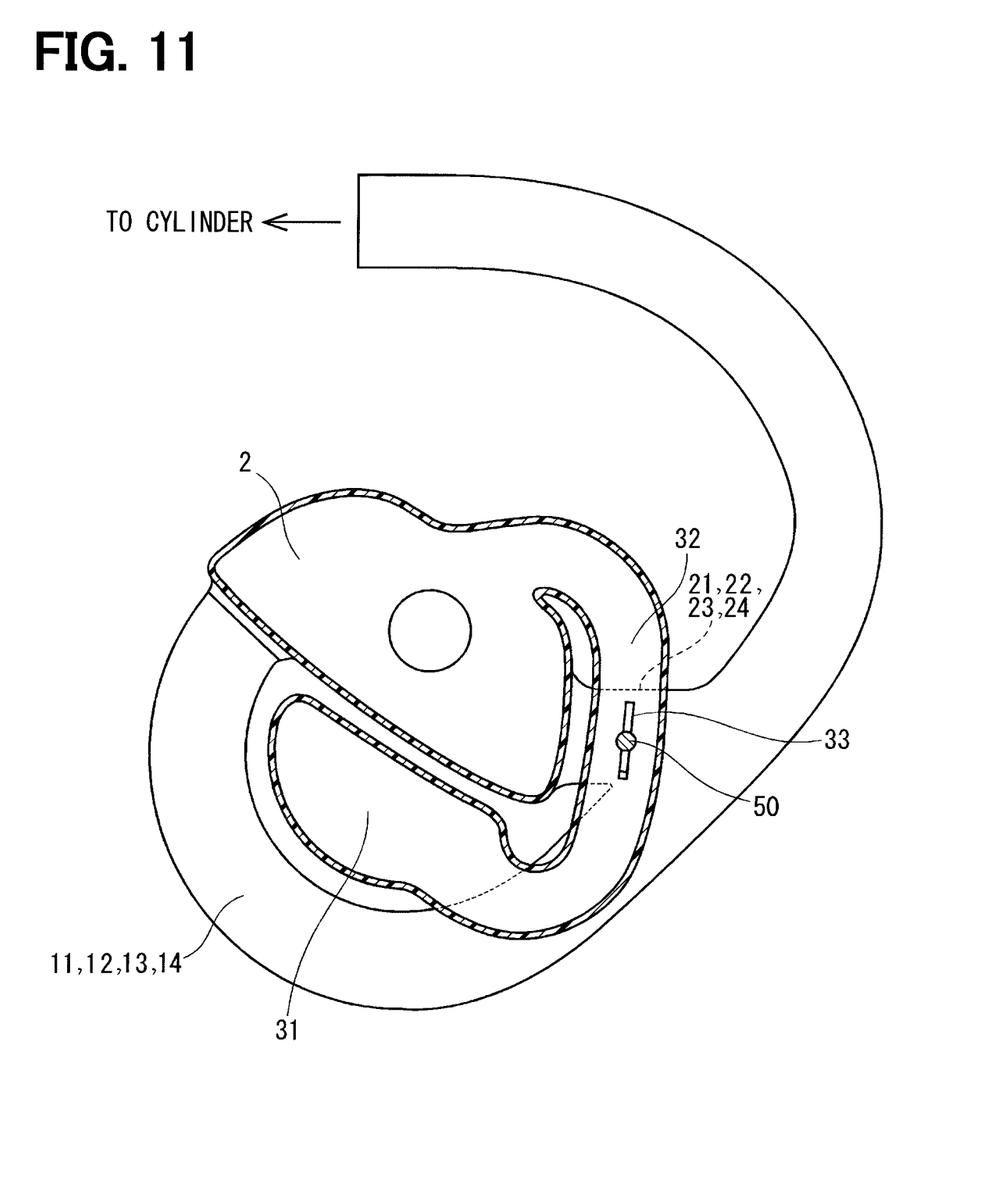
FIG. 11 is a cross-sectional view of an air intake apparatus according to a third embodiment of the present disclosure.
Figure 12:
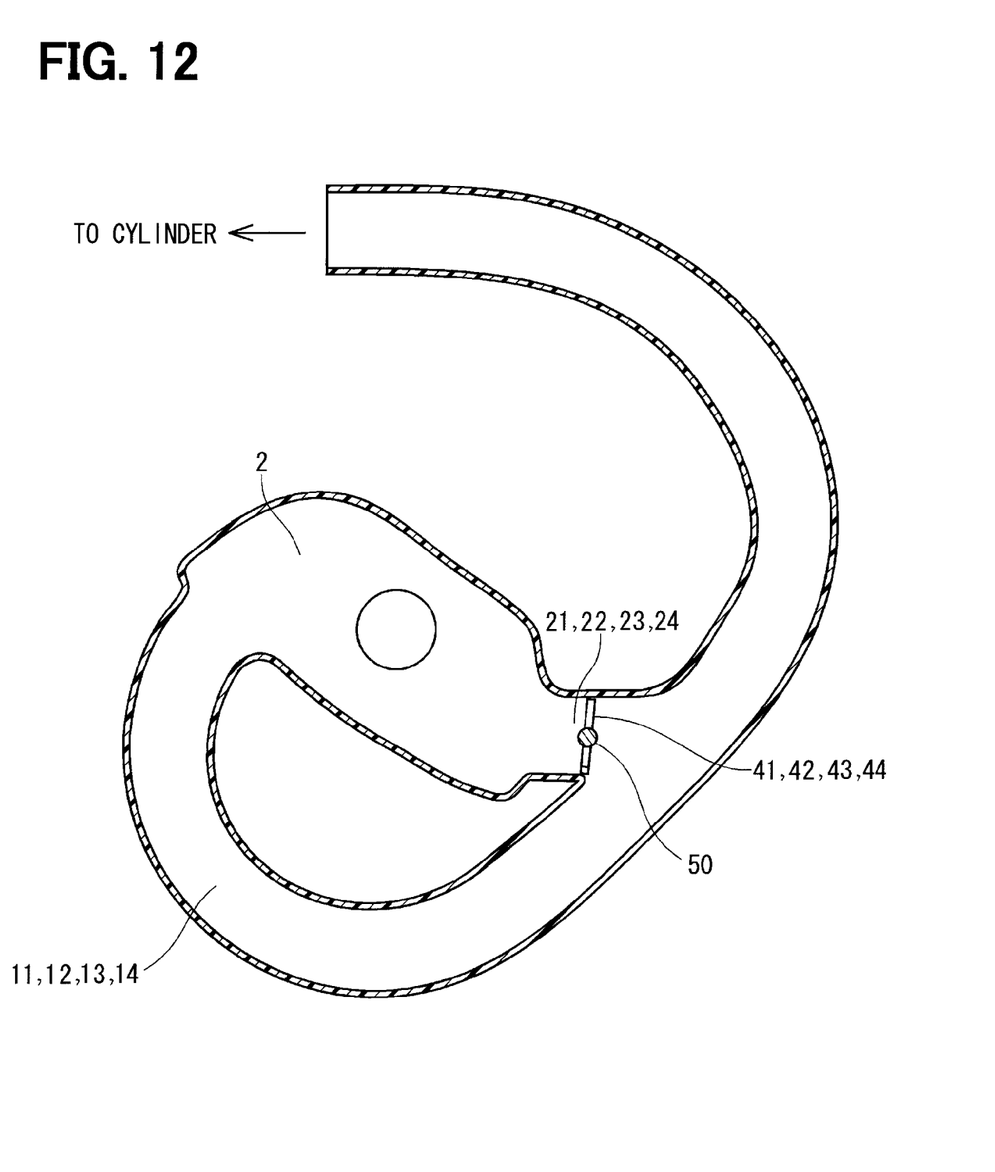
FIG. 12 is a cross-sectional view of an air intake apparatus according to a third embodiment of the present disclosure.

FIGS. 11 and 12 show a third embodiment of the present disclosure. According to the third embodiment, in a view taken in the axial direction of the shaft 50, each secondary intake passage 21-24 is angled relative to the communication passage 32 by generally 90 degrees. Thereby, the variable intake valves 41-44 and the resonator valve 33 are fixed to the shaft 50 such that the variable intake valves 41-44 extend in the common direction (the angle between each variable intake valve 41-44 and the resonator valve 33 being zero degrees). Even with this construction, the resonator valve 33 closes the communication passage 32 when the variable intake valves 41-44 open the secondary intake passages 21-24, respectively. In contrast, the resonator valve 33 opens the communication passage 32 when the variable intake valves 41-44 close the secondary intake passages 21-24, respectively.

Furthermore, the variable intake valves 41-44 and the resonator valve 33 are partially opened (half-opened) when the engine is stopped.

The air intake apparatus 1 opens the variable intake valves 41-44 and closes the resonator valve 33 when the engine start is predicted or when the engine start is sensed.

Even in the third embodiment, advantages, which are similar to those of the first and second embodiments, can be achieved.

Now, modifications of the above embodiments will be described.

In the first and second embodiments, the control operation, which is particularly effective under the high engine load, is described. In contrast, in a modification of the above embodiment(s), the air intake apparatus 1 may always open the variable intake valves 41-44 and may always close the resonator valve 33 at the time of operating the engine under the low engine load except the time of engine stop and the time of engine start. In this ways, the resistance of the intake air, which flows through the primary intake passages 11-14 and the secondary intake passages 21-24, can be reduced at the time of driving the engine under the low engine load.

The above embodiments are described with respect to the air intake apparatus, which is applied to the four cylinder engine. Alternatively, the air intake apparatus of the present disclosure may be applied to any other multi-cylinder engine, which is other than the four cylinder engine, or a single cylinder engine.

The opening and closing operation of the variable intake valves 41-44 and the resonator valve 33 in each of the low engine speed range, the middle engine speed range and the high engine speed range of the internal combustion engine may be executed based on the engine speed in the following manner. Specifically, the drive device may be configured to execute the following three operations (a) to (c).

(a) The drive device opens the variable intake valve and closes the resonator valve in the low engine speed range (a first engine speed range) of the internal combustion engine, which is lower than a first engine speed (or a first predetermined engine speed).

(b) The drive device closes the variable intake valve and opens the resonator valve in the middle engine speed range (a second engine speed range) of the internal combustion engine, which is equal to or higher than the first engine speed and is lower than a second engine speed (or a second predetermined engine speed).

(c) The drive device opens the variable intake valve and closes the resonator valve in the high engine speed range (a third engine speed range) of the internal combustion engine, which is higher than the second engine speed.

Here, it should be noted that the first engine speed and the second engine speed may vary depending on the characteristics of the internal combustion engine and/or other factors. Furthermore, the above speed ranges (the first to third engine speed ranges) may be separately set from the low engine speed range, the middle engine speed range and the high engine speed range discussed in the first embodiment depending on a need.

Furthermore, the drive device may be configured to execute the following two operations (i) and (ii).

(i) The drive device opens the variable intake valve and closes the resonator valve in one of two engine speed ranges of the internal combustion engine, wherein the one of the two engine speed ranges is lower than a corresponding reference engine speed.

(ii) The drive device closes the variable intake valve and opens the resonator valve in the other one of the two engine speed ranges of the internal combustion engine, which is higher than the corresponding reference engine speed.

In the case of the first embodiment shown in FIG. 7, the one of the two engine speed ranges of the internal combustion engine in the operation (i) may be the low engine speed range, and the other one of the two engine speed ranges in the operation (ii) may be the middle engine speed range.

Furthermore, the drive device may be configured to execute the following two operations (I) and (II).

(I) The drive device closes the variable intake valve and opens the resonator valve in one of two engine speed ranges of the internal combustion engine, wherein the one of the two engine speed ranges is lower than a corresponding reference engine speed.

(II) The drive device opens the variable intake valve and closes the resonator valve in the other one of the two engine speed ranges, which is higher than the corresponding reference engine speed.

In the case of the first embodiment shown in FIG. 7, the one of the two engine speed ranges of the internal combustion engine in the operation (I) may be the middle engine speed range, and the other one of the two engine speed ranges in the operation (II) may be the high engine speed range. Furthermore, in the case of the second embodiment shown in FIG. 9, the one of the two engine speed ranges of the internal combustion engine in the operation (I) may be the low engine speed range, and the other one of the two engine speed ranges in the operation (II) may be the high engine speed range.

Here, the corresponding reference engine speed discussed with reference to the operations (i) and (ii) may be referred to as a first reference engine speed, and the corresponding reference engine speed discussed with reference to the operations (I) and (II) may be referred to as a second reference engine speed.

The present disclosure is not limited the above embodiments and modifications thereof. That is, the above embodiments and modifications thereof may be modified in various other ways without departing from the principle of the present disclosure.

What is claimed is:

1. An air intake apparatus for an internal combustion engine, comprising:
    a surge tank, to which air is guided;
    a resonator that has a volume chamber, which is communicated with the surge tank through a communication passage;
    a primary intake passage that communicates between a cylinder of the internal combustion engine and the surge tank;
    a secondary intake passage that extends in an imaginary plane that is generally parallel to an extending direction of the communication passage, wherein the secondary intake passage communicates between the surge tank and one of the cylinder and the primary intake passage, and a passage length of the secondary intake passage is shorter than a passage length of the primary intake passage;
    a shaft that extends through the communication passage and the secondary intake passage, which are arranged one after another in a direction perpendicular to the imaginary plane;
    a variable intake valve that is fixed to the shaft, wherein the variable intake valve opens and closes the secondary intake passage;
    a resonator valve that is fixed to the shaft, wherein the resonator valve opens and closes the communication passage; and
    a drive device that rotates the shaft to drive the variable intake valve and the resonator valve,
    wherein
        when the resonator valve is opened to open the communication passage, communication between the volume chamber of the resonator and the surge tank is enabled; and
        when the resonator valve is closed to close the communication passage, the communication between the volume chamber of the resonator and the surge tank is blocked.

2. The air intake apparatus according to claim 1, wherein the variable intake valve and the resonator valve are arranged one after another in a row in an axial direction of the shaft.

3. The air intake apparatus according to claim 1, wherein the communication passage includes:
    a primary communication passage that extends generally parallel to the primary intake passage; and
    a secondary communication passage that extends generally parallel to the secondary intake passage.

4. The air intake apparatus according to claim 1, wherein the variable intake valve and the resonator valve are fixed to the shaft in a manner that satisfy the following conditions:
    the resonator valve closes the communication passage when the variable intake valve opens the secondary intake passage; and
    the resonator valve opens the communication passage when the variable intake valve closes the secondary intake passage.

5. The air intake apparatus according to claim 1, wherein the drive device opens the variable intake valve and closes the resonator valve based on an engine speed of the internal combustion engine when a volumetric efficiency achieved with a resonance of the resonator is lower than a volumetric efficiency achieved with a reflected wave from an atmosphere side of the surge tank.

6. The air intake apparatus according to claim 1, wherein the drive device closes the variable intake valve and opens the resonator valve based on an engine speed of the internal combustion engine during a corresponding period from a time, at which the volumetric efficiency achieved with the resonance of the resonator becomes higher than the volumetric efficiency achieved with the reflected wave from the atmosphere side of the surge tank, to a time, at which a volumetric efficiency achieved with a reflected wave from the surge tank through the primary intake passage is higher than a volumetric efficiency achieved with a reflected wave from the surge tank through the secondary intake passage.

7. The air intake apparatus according to claim 1, wherein the drive device opens the variable intake valve and closes the resonator valve based on an engine speed of the internal combustion engine when the volumetric efficiency achieved with the reflected wave from the surge tank through the secondary intake passage is higher than the volumetric efficiency achieved with the reflected wave from the surge tank through the primary intake passage.

8. The air intake apparatus according to claim 1, wherein the drive device opens the variable intake valve and closes the resonator valve when start of the internal combustion engine is sensed or when the start of the internal combustion engine is predicted.

9. The air intake apparatus according to claim 1, wherein the drive device partially opens the variable intake valve and the resonator valve when the internal combustion engine is stopped.

10. The air intake apparatus according to claim 1, wherein the drive device is configured to execute the following two operations:
    the drive device opens the variable intake valve and closes the resonator valve in one of two engine speed ranges of the internal combustion engine, wherein the one of the two engine speed ranges is lower than a corresponding reference engine speed; and
    the drive device closes the variable intake valve and opens the resonator valve in the other one of the two engine speed ranges of the internal combustion engine, which is higher than the corresponding reference engine speed.

11. The air intake apparatus according to claim 1, wherein the drive device is configured to execute the following two operations:
    the drive device closes the variable intake valve and opens the resonator valve in one of two engine speed ranges of the internal combustion engine, wherein the one of the two engine speed ranges is lower than a corresponding reference engine speed; and
    the drive device opens the variable intake valve and closes the resonator valve in the other one of the two engine speed ranges of the internal combustion engine, which is higher than the corresponding reference engine speed.

12. The air intake apparatus according to claim 1, wherein the drive device is configured to execute the following three operations:
- the drive device opens the variable intake valve and closes the resonator valve in a first engine speed range of the internal combustion engine, which is lower than a first engine speed;
- the drive device closes the variable intake valve and opens the resonator valve in a second engine speed range of the internal combustion engine, which is equal to or higher than the first engine speed and is lower than a second engine speed; and
- the drive device opens the variable intake valve and closes the resonator valve in a third engine speed range of the internal combustion engine, which is higher than the second engine speed.

\* \* \* \* \*